United States Patent
Miyazaki et al.

(10) Patent No.: US 7,342,338 B2
(45) Date of Patent: Mar. 11, 2008

(54) PERMANENT MAGNET ELECTRIC MOTOR WITH REDUCED COGGING TORQUE

(75) Inventors: Takashi Miyazaki, Tokyo (JP);
Tomohiro Kikuchi, Tokyo (JP);
Haruyuki Kometani, Tokyo (JP);
Shinichi Yamaguchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 362 days.

(21) Appl. No.: 10/500,624

(22) PCT Filed: Apr. 11, 2003

(86) PCT No.: PCT/JP03/04643

§ 371 (c)(1),
(2), (4) Date: Jul. 2, 2004

(87) PCT Pub. No.: WO2004/093298

PCT Pub. Date: Oct. 28, 2004

(65) Prior Publication Data

US 2006/0244335 A1   Nov. 2, 2006

(51) Int. Cl.
*H02K 1/27* (2006.01)
*H02K 1/14* (2006.01)
*H02K 21/14* (2006.01)

(52) U.S. Cl. .......... 310/156.47; 310/112; 310/254; 310/216

(58) Field of Classification Search .......... 310/156.47, 310/112, 216, 254
See application file for complete search history.

(56) References Cited

U.S. PATENT DOCUMENTS

| 4,489,249 | A | * | 12/1984 | Olivier | 310/216 |
| 4,616,151 | A | * | 10/1986 | Pryjmak | 310/216 |
| 4,761,576 | A | * | 8/1988 | Savage | 310/51 |
| 5,010,266 | A | * | 4/1991 | Uchida | 310/156.22 |
| 5,086,245 | A | * | 2/1992 | Sieja et al. | 310/216 |
| 5,220,228 | A | * | 6/1993 | Sibata | 310/254 |
| 5,397,951 | A | * | 3/1995 | Uchida et al. | 310/156.21 |

(Continued)

FOREIGN PATENT DOCUMENTS

EP   1052761 A2 * 11/2000

(Continued)

OTHER PUBLICATIONS

Japanese Office Action dated Oct. 2, 2007.

*Primary Examiner*—Burton Mullins
(74) *Attorney, Agent, or Firm*—Sughrue Mion, PLLC (57) ABSTRACT

A permanent magnet electric motor 10 comprises a rotor 30 provided with two stages of permanent magnets in the axial direction on an outer circumferential face of a rotor iron core, and having a shaft shifted by a stage skew angle θr in electrical angle to decrease a first frequency component of cogging torque in the circumferential direction of the rotor iron core between two stages of the permanent magnets, a stator iron core 21 of cylindrical shape provided with the stator winding for producing a rotating magnetic field causing the rotor 30 to be rotated, and a stator 20 dividing the stator iron core 21 into plural blocks in the axial direction, and shifted by a stage skew angle θs in electrical angle to decrease a second frequency component of the cogging torque in the circumferential direction of the stator iron core 21.

4 Claims, 10 Drawing Sheets

U.S. PATENT DOCUMENTS

| | | | |
|---|---|---|---|
| 5,861,699 A * | 1/1999 | Kopac | 310/254 |
| 5,969,454 A * | 10/1999 | Pengov et al. | 310/162 |
| 6,008,559 A * | 12/1999 | Asano et al. | 310/156.53 |
| 6,252,323 B1 * | 6/2001 | Nishikawa et al. | 310/156.01 |
| 6,369,686 B1 * | 4/2002 | Pielok | 336/234 |
| 6,414,413 B1 * | 7/2002 | Arai et al. | 310/214 |
| 6,462,452 B2 | 10/2002 | Nakano et al. | |
| 6,597,078 B2 * | 7/2003 | Crapo et al. | 310/156.01 |
| 6,657,349 B2 * | 12/2003 | Fukushima | 310/156.47 |
| 6,707,209 B2 * | 3/2004 | Crapo et al. | 310/156.43 |
| 6,777,847 B1 * | 8/2004 | Saban et al. | 310/211 |
| 6,867,524 B2 * | 3/2005 | Liang | 310/156.47 |
| 6,873,081 B2 * | 3/2005 | Arai et al. | 310/215 |
| 6,876,115 B2 * | 4/2005 | Takahashi et al. | 310/156.47 |
| 6,906,443 B2 * | 6/2005 | Luo et al. | 310/156.47 |
| 6,952,064 B2 * | 10/2005 | Hiwaki et al. | 310/214 |
| 7,067,948 B2 * | 6/2006 | Yamaguchi et al. | 310/156.47 |
| 2002/0047431 A1 * | 4/2002 | Fukushima | 310/156.47 |
| 2002/0067092 A1 * | 6/2002 | Crapo et al. | 310/156.47 |
| 2002/0130580 A1 * | 9/2002 | Arai et al. | 310/156.47 |
| 2003/0011272 A1 * | 1/2003 | Katoaka et al. | 310/254 |
| 2003/0230947 A1 * | 12/2003 | Islam et al. | 310/156.47 |
| 2004/0021392 A1 * | 2/2004 | LaBrush | 310/216 |
| 2004/0084985 A1 * | 5/2004 | Hasumi | 310/156.43 |
| 2004/0124728 A1 * | 7/2004 | Yamaguchi et al. | 310/156.25 |
| 2004/0164635 A1 * | 8/2004 | Takahashi et al. | 310/156.47 |
| 2004/0195926 A1 * | 10/2004 | Hiwaki et al. | 310/216 |
| 2004/0207280 A1 * | 10/2004 | Luo et al. | 310/156.47 |
| 2004/0217665 A1 * | 11/2004 | Hans | 310/156.47 |
| 2005/0023919 A1 * | 2/2005 | Nakano et al. | 310/156.47 |
| 2005/0121990 A1 * | 6/2005 | Kaneko | 310/156.47 |
| 2006/0192456 A1 * | 8/2006 | Yamaguchi et al. | 310/156.47 |
| 2006/0244335 A1 * | 11/2006 | Miyazaki et al. | 310/216 |

FOREIGN PATENT DOCUMENTS

| | | |
|---|---|---|
| JP | 02254954 A | 10/1990 |
| JP | 4-021330 | 1/1992 |
| JP | 10-257700 A | 9/1998 |
| JP | 2000-308286 A | 11/2000 |
| JP | 2000-324768 A | 11/2000 |
| JP | 2001037113 A * | 2/2001 |
| JP | 2002-512499 A | 4/2002 |
| JP | 2002136003 A * | 10/2002 |
| JP | 2003-32927 A | 1/2003 |
| JP | 2003-32930 A | 1/2003 |
| JP | 2003-032939 A | 1/2003 |
| JP | 2003032939 A * | 1/2003 |
| JP | 2003-061326 A | 2/2003 |
| JP | 2003284276 A1 * | 10/2003 |
| JP | 2004159492 A * | 6/2004 |
| JP | 2005261188 A * | 9/2005 |
| WO | WO 98/40952 A1 | 9/1998 |
| WO | WO 9840952 A1 * | 9/1998 |

* cited by examiner

— FUNDAMENTAL WAVE COMPONENT OF COGGING TORQUE MAGNETIC CHARACTERISTIC A
—·— FUNDAMENTAL WAVE COMPONENT OF COGGING TORQUE MAGNETIC CHARACTERISTIC B

FIG. 8

— SECOND ORDER HIGHER HARMONIC WAVE COMPONENT OF COGGING TORQUE MAGNETIC CHARACTERISTIC A
—·— SECOND ORDER HIGHER HARMONIC WAVE COMPONENT OF COGGING TORQUE MAGNETIC CHARACTERISTIC B

PERMANENT MAGNET ELECTRIC MOTOR WITH REDUCED COGGING TORQUE

TECHNICAL FIELD

The present invention relates to improvements in a permanent magnet electric motor to reduce a cogging torque.

BACKGROUND ART

A permanent magnet electric motor produces a rotational variation called a cogging torque. The cogging torque generates a vibration or noise to cause the control performance of electric motor to be degraded. Therefore, a method for reducing the cogging torque was disclosed in JP-A-4-21330. According to this patent, to remove two frequency components of the cogging torque, permanent magnets are arranged at four stages in the axial direction of a rotor iron core and shifted in the circumferential direction of the rotor iron core to give rise to a skew effect, so that a plurality of permanent magnets are dislocated in the circumferential direction depending on an axial position of the rotor, namely, arranged on the surface of the rotor iron core at a skew angle (hereinafter referred to a stage skew angle).

A theoretically calculated angle (hereinafter referred to as a theoretical angle $\theta t$) for the stage skew angle is employed. The theoretical angle $\theta t1$ for a fundamental wave component of the cogging torque is given by $\theta t1$=(360°/least common multiple of the number of stator magnetic poles and the number of rotor magnetic poles)/2    (3)

Further, the theoretical angle $\theta t2$ for the second order higher harmonic wave component of the cogging torque is half $\theta t1$.

However, if the theoretical angle of stage skew angle is actually applied to the permanent magnet electric motor, a reduced cogging torque is possibly less sufficient. Its reason is that an axial leakage flux occurs due to employment of the stage skew, but the influence of a magnetic saturation with the leakage flux is not considered. The leakage flux causing the cogging torque may occur at the stage portion of the permanent magnet and inside the rotor iron core, but the leakage flux inside the stator iron core is a main cause of the cogging torque. Therefore, there was a problem that the cogging torque was not fully reduced because the theoretical angle was employed for the skew angle of the rotor.

Also, the constitution of the rotor was complex to remove two frequency components of the cogging torque.

DISCLOSURE OF THE INVENTION

The present invention has been achieved to solve the above-mentioned problems, and it is an object of the invention to provide a permanent magnet electric motor in which two frequency components of the cogging torque are removed and the rotor has a simple constitution.

Also, it is another object of the invention to provide a permanent magnet electric motor in which the cogging torque is lower than at the theoretical angle employed for the stage skew angle.

A permanent magnet electric motor according to this invention is characterized by comprising a rotor provided with two stages of permanent magnets in the axial direction on an outer circumferential face of a rotor iron core, and having a shaft shifted by a first stage skew angle $\theta r$ in electrical angle to decrease a first frequency component of cogging torque in the circumferential direction of the rotor iron core between two stages of the permanent magnets, a stator iron core of cylindrical shape provided with the stator winding for producing a rotating magnetic field causing the rotor to be rotated, and a stator dividing the stator iron core in plural blocks in the axial direction, and shifted by a second stage skew angle $\theta s$ in electrical angle to decrease a second frequency component of the cogging torque in the circumferential direction of the stator iron core.

This permanent magnet electric motor has an advantage that two frequency components of the cogging torque are decreased and the rotor has a simple construction, because the rotor and the stator are provided with the first and second stage skews.

The permanent magnet electric motor according to another invention is characterized in that $\theta t$=(360°/least common multiple of the number of stator magnetic poles and the number of rotor magnetic poles)/2, $\theta t < \theta r < (700 \times 10^{-3}/Lc + \theta t)$, where the axial length of the stator iron core is Lc (m), and the theoretical angle of the first stage skew angle is an electrical angle $\theta t(°)$.

This permanent magnet electric motor has an advantage that two frequency components of the cogging torque are lower than at the theoretical angle employed for the stage skew angle, and the rotor has a simple construction.

The permanent magnet electric motor according to another invention is characterized in that the stator has the stator iron core divided into the first, second and third stator blocks in the axial direction, wherein the second stage skew angle $\theta s$ is provided between the first stator block and the second stator block, and between the second stator block and the third stator block.

This permanent magnet electric motor has an advantage that the stator has a simple construction.

The permanent magnet electric motor according to another invention is characterized in that a clearance Lcg is provided between the first stator block and the second stator block, and between the second stator block and the third stator block, such that the inequality 0<Lcg<2.2 gm holds, where gm is a gap between the stator and the rotor.

This permanent magnet electric motor has an advantage that the induced voltage constant ratio is not reduced by decreasing the leakage flux in the axial direction at the top end of the stator magnetic pole teeth owing to a clearance Lcg.

BEST MODE FOR CARRYING OUT THE INVENTION

Embodiment 1

Figure 1:
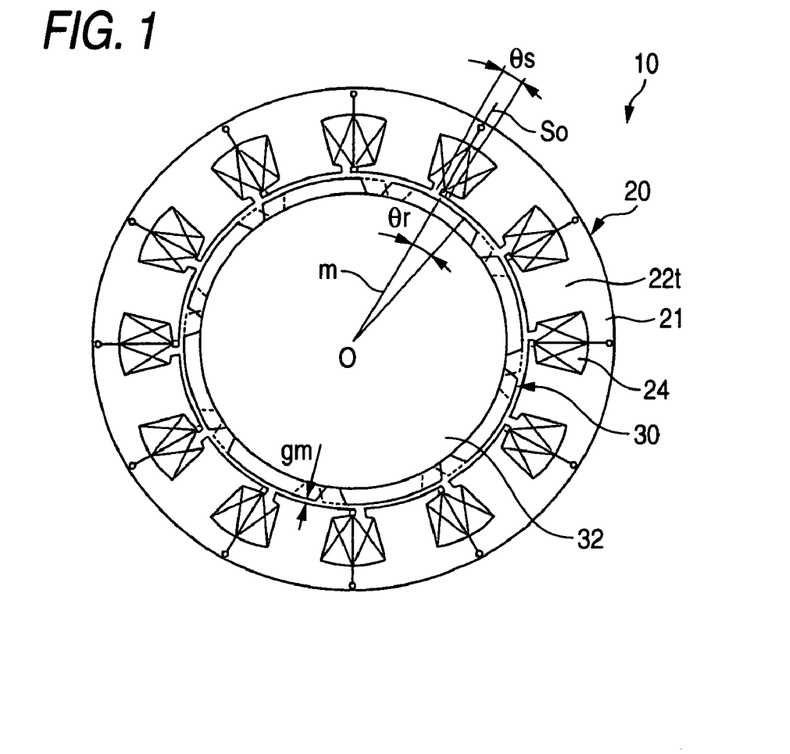
FIG. 1 is a side cross-sectional view of a permanent magnet electric motor according to one embodiment of the present invention.
Figure 2:
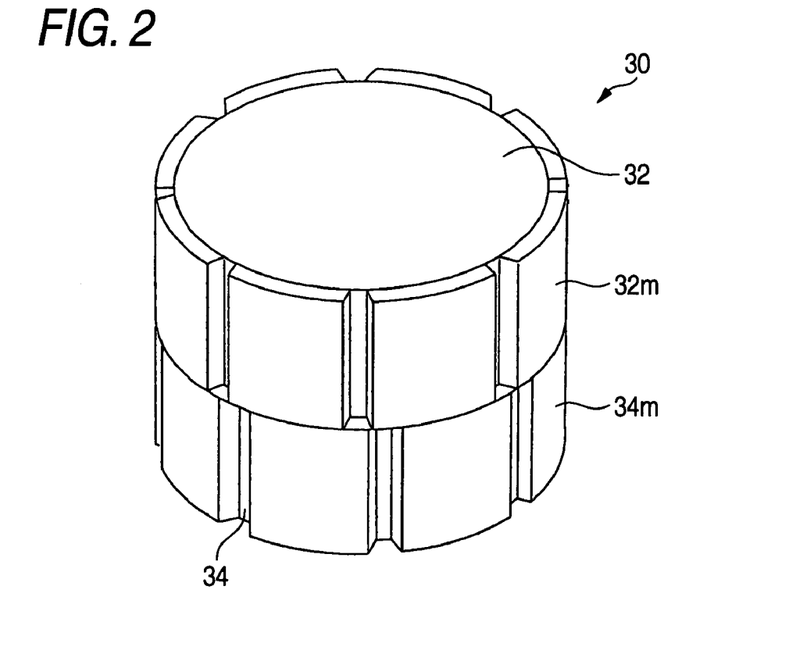
FIG. 2 is a perspective view of a rotor in the permanent magnet electric motor as shown in FIG. 1.
Figure 3A:
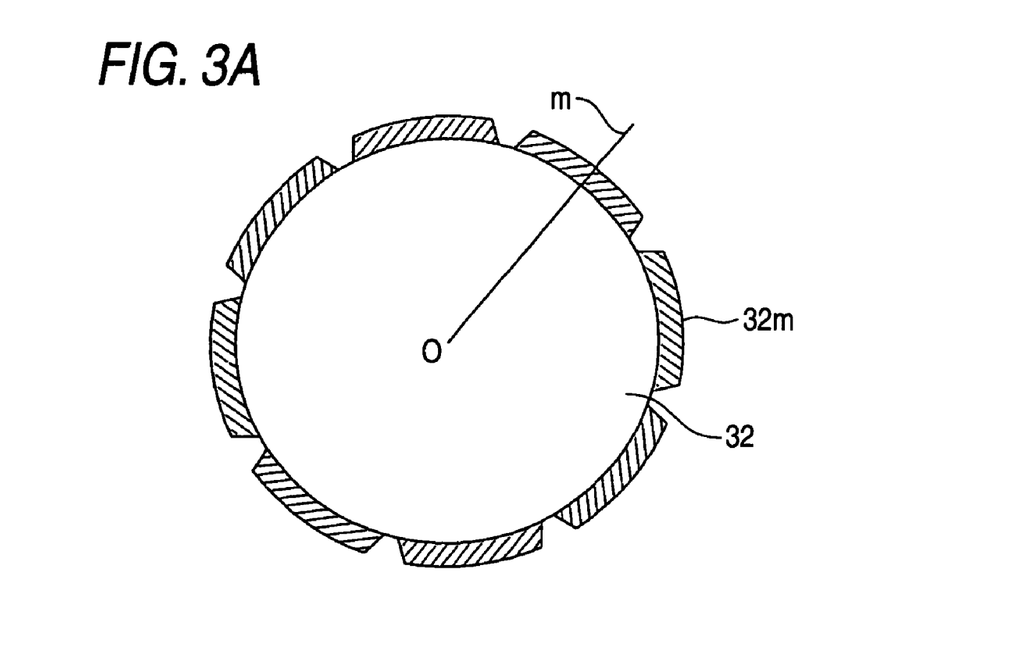
FIGS. 3A and 3B are plan views of the rotor in the permanent magnet electric motor as shown in FIG. 1.
Figure 3B:
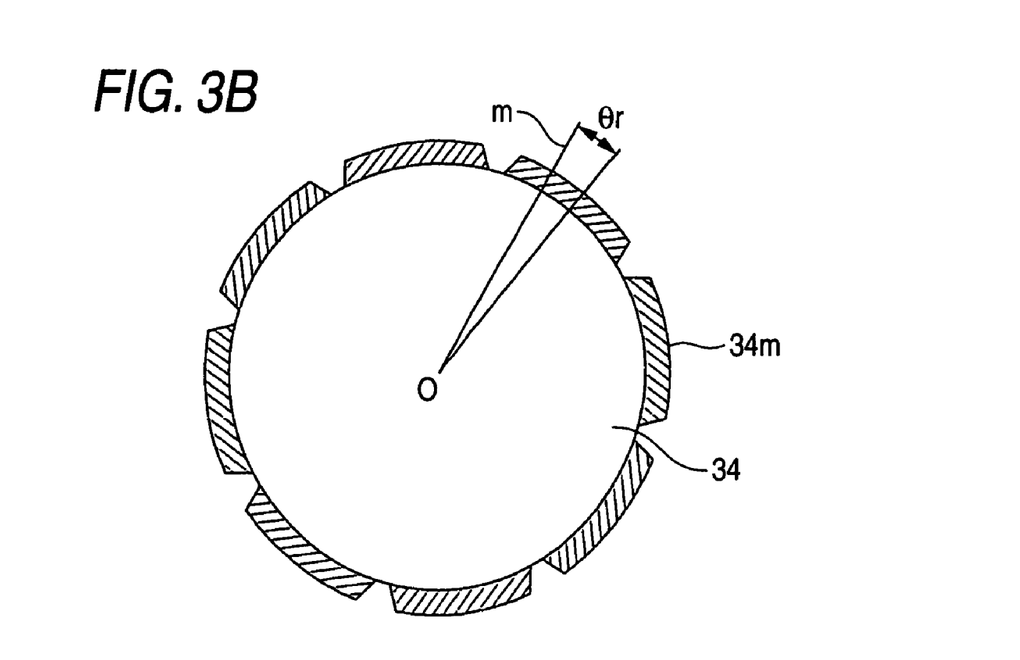
Figure 4:
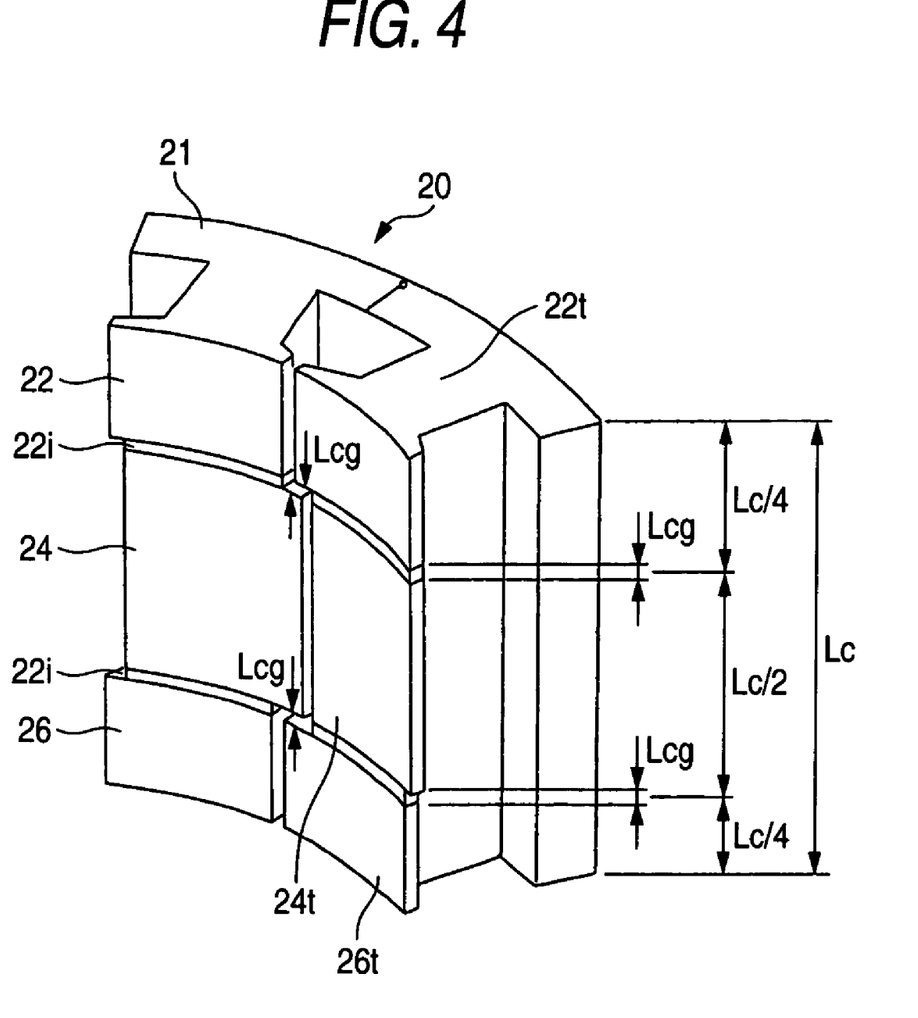
FIG. 4 is a perspective view of a stator in the permanent magnet electric motor as shown in FIG. 1.

Referring to FIGS. 1 to 5, an embodiment 1 of the present invention will be described below. FIG. 1 is a side cross-sectional view of a permanent magnet electric motor according to the embodiment 1 of the invention. FIG. 2 is a perspective view of a rotor in the permanent magnet electric motor as shown in FIG. 1. FIGS. 3A and 3B are plan views of the rotor in the permanent magnet electric motor as shown in FIG. 1. FIG. 4 is a perspective view of a stator in the permanent magnet electric motor as shown in FIG. 1. FIGS. 5A-5C are plan views of an upper stage stator block, a middle stage stator block, and a lower stage stator block as shown in FIG. 4.

In FIGS. 1 to 5, the permanent magnet electric motor 10 is formed of an electromagnetic steel plate that is punched with the stator magnetic pole teeth 22t connected to a thin connecting portion, and comprises a stator iron core 21 of cylindrical shape, a stator 20 with 12 magnetic poles formed by winding a plurality of stator windings 24 around the inner circumference of the stator iron core 21, and a rotor 30 with eight magnetic poles having a rotor iron core 32 rotatable around the center of the stator 20 and making a gap gm (m) with the stator 20, whereby the rotor 30 is rotated around a rotational shaft under a rotating magnetic field by energizing the stator windings 24.

In FIGS. 2 and 3, the rotor 30 has eight magnetic poles, and comprises two rotor iron cores 32 and 34 of cylindrical shape which are formed of an electromagnetic steel plate at two stages, an upper stage permanent magnet 32m and a lower stage permanent magnet 34m which are arcuate and bonded in which N pole and S pole alternately arranged on the outer circumferential face of the rotor iron cores 32 and 34. To remove a fundamental wave component of cogging torque, the lower stage permanent magnet 34m is circumferentially shifted by an angle θr in electrical angle with respect to the line O-m connecting the line m passing through the center of the upper stage permanent magnet 32m and the center O of the rotor iron core, thereby forming a rotor skew angle θr (electrical angle) as the first stage skew angle.

In FIG. 4, the stator 21 is composed of an upper stage stator block 22 as the first stator block, a middle stage stator block 24 as the second stator block, and a lower stage stator block 26 as the third stator block, which are disposed in the axial direction, with the axial length being Lc. Further, the stator 21 comprises two filling stator blocks 22i having the axial length Lcg inserted between the upper stage stator block 22 and the middle stage stator block 24, and between the middle stage stator block 24 and the lower stage stator block 26, in which the middle stage stator block 24 and the lower stage stator block 26 are circumferentially shifted by a stator skew angle θs (electrical angle) of 15° as a second stage skew angle corresponding to the theoretical angle to remove the second order higher harmonic wave component of cogging torque.

And the upper stage stator block 22, the middle stage stator block 24, and the lower stage stator block 26 are formed in the axial length (Lc/4-Lcg/2), (Lc/2-Lcg) and (Lc/4-Lcg/2), respectively.

Figure 5A:
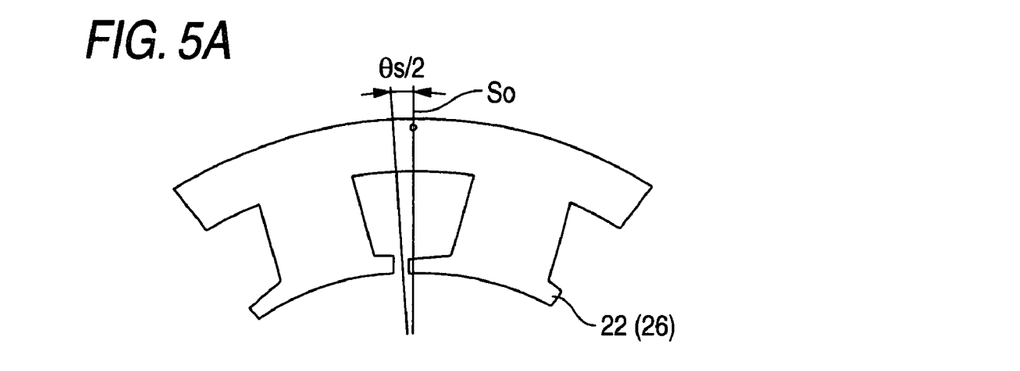
FIGS. 5A-5C are partial plan views of an upper stage stator block, a middle stage stator block, and a lower stage stator block as shown in FIG. 4.
Figure 5B:
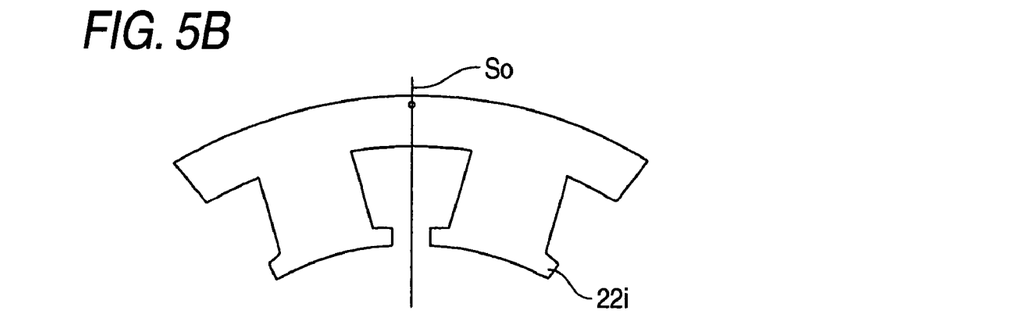
Figure 5C:
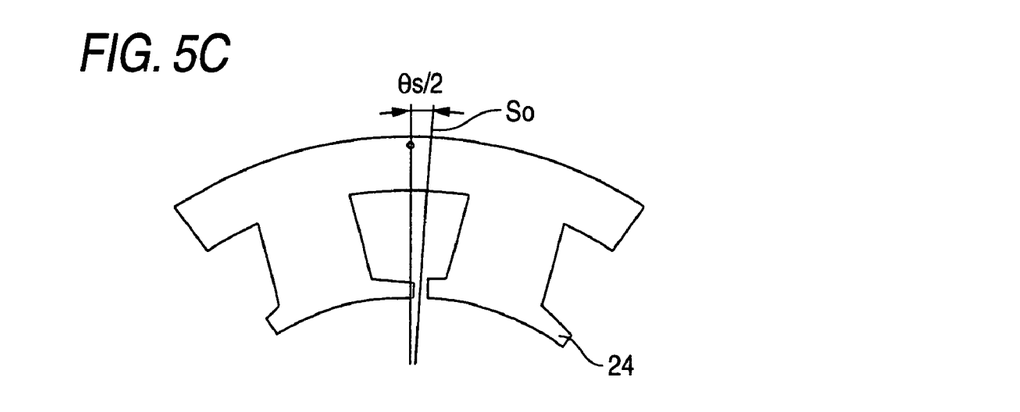

In FIGS. 5A-5C, to implement the shift by the stator skew angle θs, the upper stage stator block 22 and the lower stage stator block 26 are shifted by angle θs/2 counterclockwise from the central line S0 of slot, the filling stator block 22i is matched with the central line S0 of slot, and the middle stage stator block 24 is shifted by angle θs/2 clockwise from the central line S0 of slot.

The stator 20 is provided with a clearance Lcg (m) in the axial direction of the stator between the end portions of the upper stage stator block 22 and the middle stage stator block 24 by inserting the filling stator block 22i. Similarly, the stator 20 is provided with a clearance Lcg (m) in the axial direction of the stator 20 between the end portions of the middle stage stator block 24 and the lower stage stator block 26. There is a relation 0<Lcg<2.2 gm between the gap gm and clearance Lcg.

Figure 6:
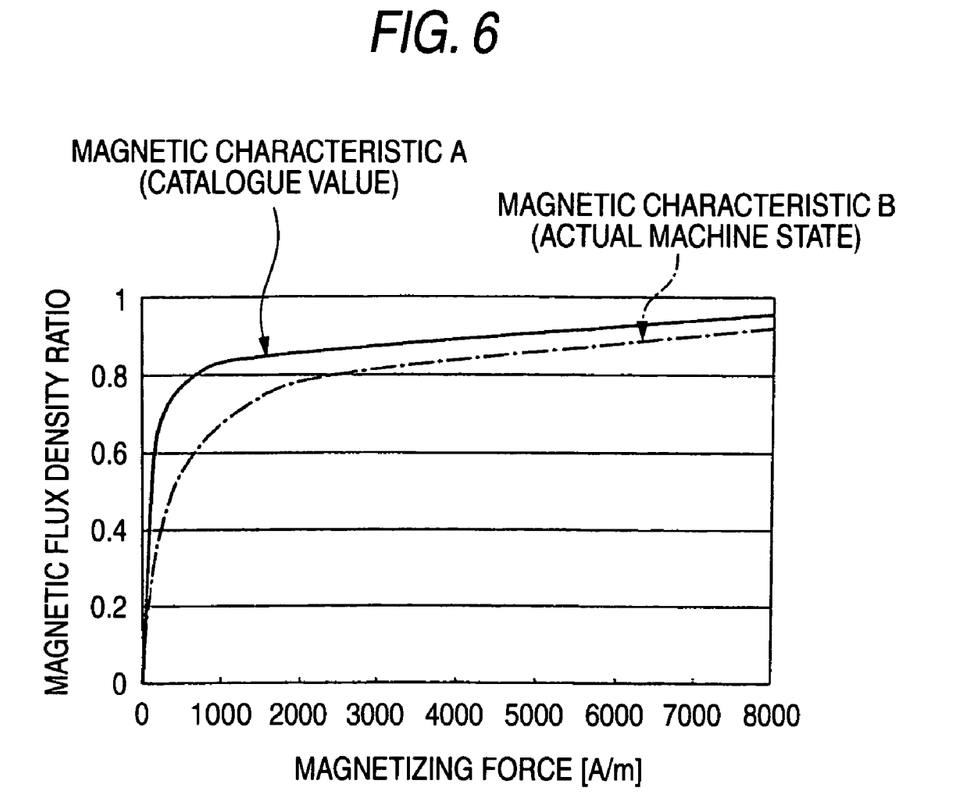
FIG. 6 is a curve showing the magnetic characteristics of a stator iron core and a rotor iron core in the permanent magnet electric motor as shown in FIG. 1.

Referring to FIGS. 6 to 9, the reason why the skew angle is deviated from the theoretical value is explained below. FIG. 6 is a BH characteristic curve of the stator iron core 20 and the rotor iron core that are employed for analysis. In FIG. 6, the magnetic flux density ratio in the longitudinal axis indicates the ratio of magnetic flux density to the reference value that is a saturation magnetic flux density of the material of magnetic characteristic A, and the magnetizing force is indicated in the transverse axis. Magnetic characteristic A shows an instance where there is no influence of working. Magnetic characteristic B shows an instance where the magnetic flux density ratio is reduced by about 20% in the vicinity of a magnetizing force H=1000 A/m as compared with the magnetic characteristic A, corresponding to the permanent magnet electric motor 10 that is actually employed. This is because the permanent magnet electric motor 10 is degraded in the characteristics during the process of working the stator 20 and the rotor 30.

Figure 7:
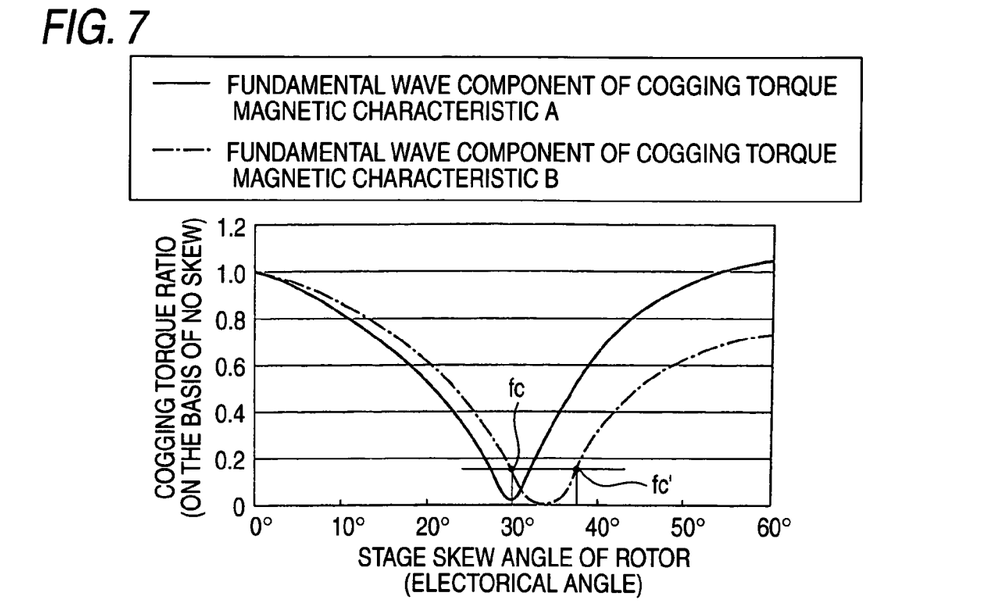
FIG. 7 is a characteristic curve showing the fundamental wave component of cogging torque and the rotor skew angle obtained as a result from the three dimensional magnetic field analysis for the permanent magnet electric motor as shown in FIG. 1.
Figure 8:
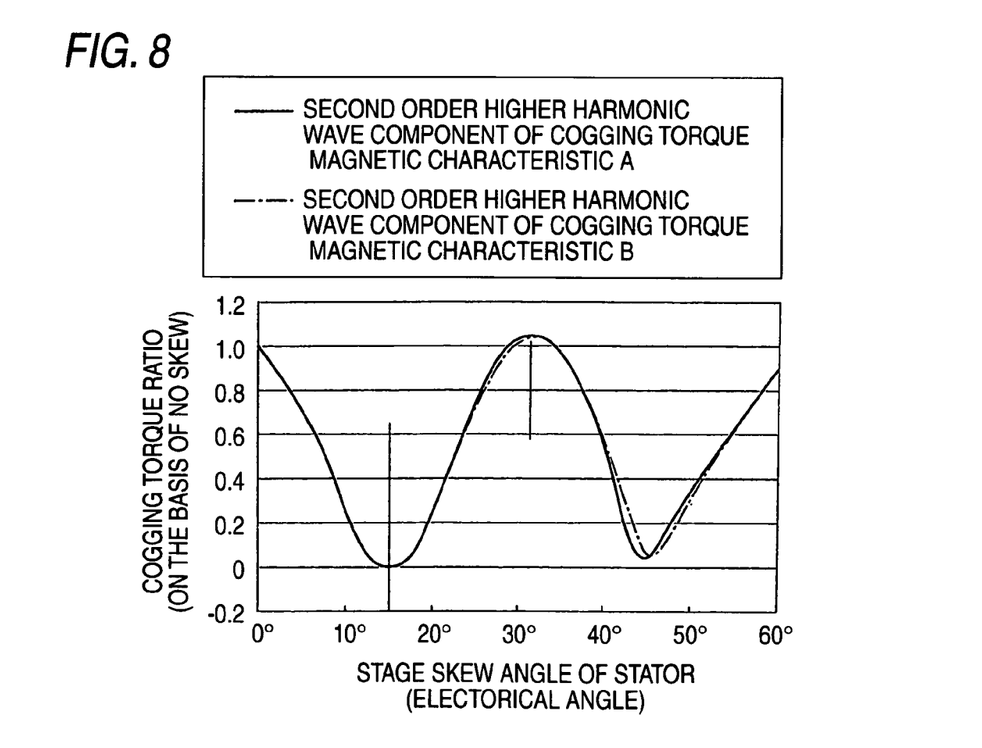
FIG. 8 is a characteristic curve showing the second order higher harmonic wave component of cogging torque and the rotor skew angle obtained as a result from the three dimensional magnetic field analysis for the permanent magnet electric motor as shown in FIG. 1.

Referring to FIGS. 7 and 8, the relationship between the cogging torque and the rotor skew angle θr and stator skew angle θs in the cases of the magnetic characteristics A and B is explained below. FIG. 7 is a characteristic curve showing the results from the three dimensional magnetic field analysis for the fundamental wave component of cogging torque in the permanent magnet electric motor 10. Likewise, FIG. 8 is a characteristic curve showing the results from the three dimensional magnetic field analysis for the second order higher harmonic wave component of cogging torque.

In FIGS. 7 and 8, for the magnetic characteristics A and B of the stator iron core 20, the longitudinal axis indicates how the cogging torque of the rotor 30 or the stator 20 with stage skew falls, when the cogging torque without stage skew is supposed to be 1, and the transverse axis indicates the skew angle (electrical angle) θr, θs.

In FIG. 7, for the fundamental wave component of cogging torque, the rotor skew angle θr at which the cogging torque ratio is minimum is increased as the magnetic characteristic is degraded from A to B. This is because a leakage flux occurs in the axial direction inside the stator iron core 21 by employing the stage skew.

The rotor skew angle θr is greater than the theoretical angle 30° at which the cogging torque is minimum, as the magnetic characteristic of the stator iron core is degraded. In the magnetic characteristic B, when the rotor skew angle θr is the theoretical angle of 30°, the cogging torque ratio at point fc is about 0.18. When the rotor skew angle θr is beyond the theoretical angle of 30° and the cogging torque ratio is less than or equal to 0.18 at point fc, the rotor skew angle θr is reduced below the stage skew angle θr (about 37°) that is the maximum value at point fc', whereby the fundamental wave component of cogging torque is lower than at the theoretical angle 30°.

In FIG. 8, for the second order higher harmonic wave component of cogging torque, when the stator skew angle θs is the theoretical angle θt, the cogging torque ratio is minimum at the electrical angles of 15° and 45°. This is because the second order higher harmonic wave component of cogging torque is less susceptible to the axial leakage magnetic flux or magnetic saturation.

FIGS. 9A-9D shows the results of the three dimensional analysis for the fundamental wave component of cogging torque when the axial length Lc of the stator iron core is changed, on the basis of the rotor skew angle θr=0, namely, the cogging torque in the rotor 30 without forming the skew. The rotor skew angle θr at which the cogging torque is minimum is different from the theoretical angle, because an axial leakage flux occurs inside the stator iron core 21k as the stator 20 is worked and degraded in a portion of the stage skew. The cogging torque based on the axial leakage flux is almost constant without regard to the axial length Lc, because the axial leakage flux occurs near the stage skew portion. Accordingly, when the axial length Lc of the stator iron core 21 is small, the rotor skew angle θr must be greater than the theoretical angle θt, because the axial leakage flux has a relatively great influence. On the contrary, when the axial length Lc of the stator iron core 21 is large, the rotor skew angle θr is closer to the theoretical angle θs, because the axial leakage flux has a relatively small influence.

Figure 9A:
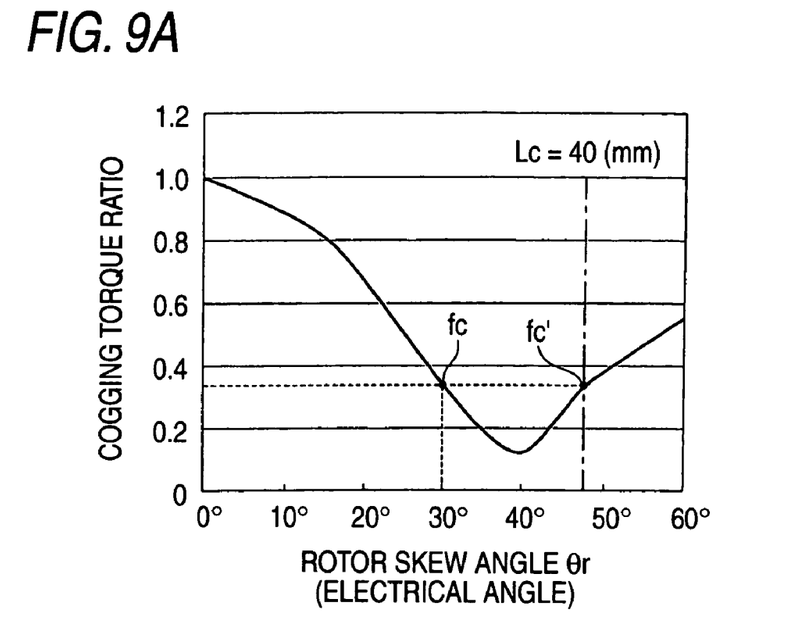
FIGS. 9A-9D are characteristic curves showing the relationship between the rotor skew angle and the cogging torque by changing the axial length of the stator in the permanent magnet electric motor as shown in FIG. 1.

In FIG. 9A, when the axial length Lc of the stator 20 is Lc=40×10$^{-3}$(m), the rotor skew angle θr is greater than the theoretical angle θt=30° at point fc, the minimum value of the cogging torque is 40.1°, and the rotor skew angle θr at point fc' at which the cogging torque is equal to the theoretical angle θr=30° is 47.5°. That is, when the rotor skew angle θr is greater than the theoretical angle θt=30°, and smaller than 47.5°, the cogging torque is reduced as compared with when the rotor skew angle is set at the theoretical angle θt.

Figure 9B:
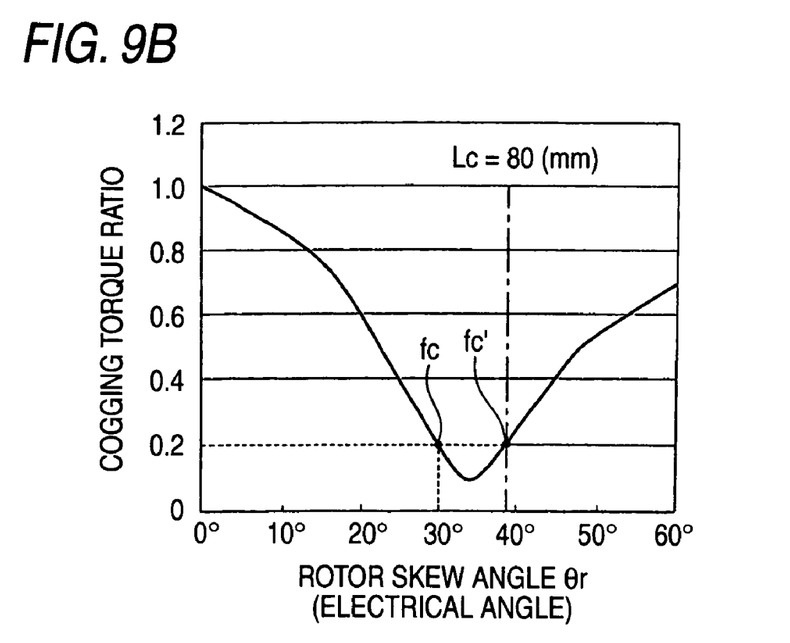

In FIG. 9B, when the axial length Lc of the stator 20 is Lc=80×10$^{-3}$(m), the rotor skew angle θr is greater than the theoretical angle θt=30° at point fc, the minimum value of the cogging torque is 33.8°, and the rotor skew angle θr at point fc' at which the cogging torque is equal to the theoretical angle θr=30° is 38.8°. That is, when the rotor skew angle θr is greater than the theoretical angle θt=30°, and smaller than 38.8°, the cogging torque is reduced as compared with when the rotor skew angle is set at the theoretical angle θt.

Figure 9C:
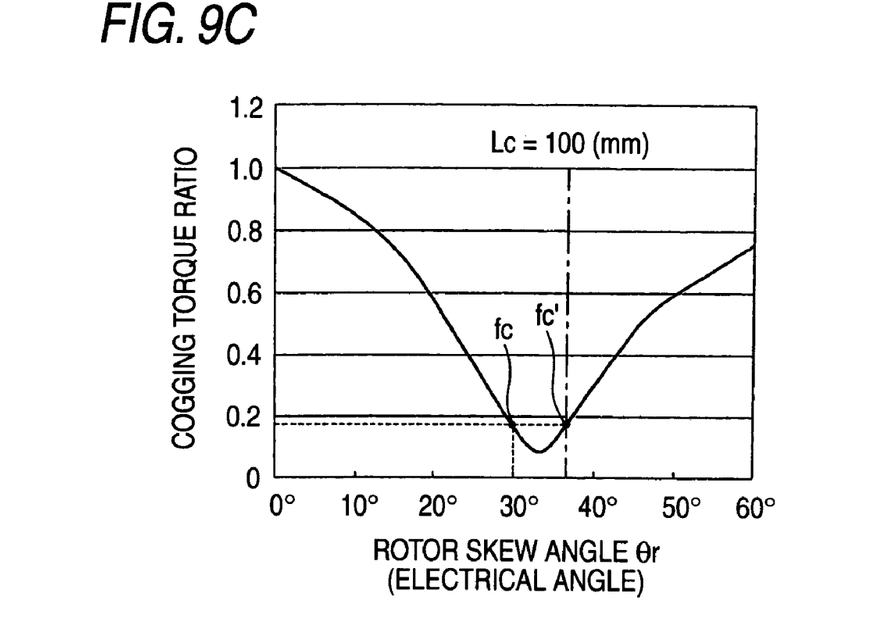

In FIG. 9C, when the axial length Lc of the stator 20 is Lc=100×10$^{-3}$(m), the rotor skew angle θr is greater than the theoretical angle θt=30° at point fc, the minimum value of the cogging torque is 33°, and the rotor skew angle θr at point fc' at which the cogging torque is equal to the theoretical angle θr=30° is 37.0°. That is, when the rotor skew angle θr is greater than the theoretical angle θt=30°, and smaller than 37.0°, the cogging torque is reduced as compared with when the rotor skew angle is set at the theoretical angle θt.

Figure 9D:
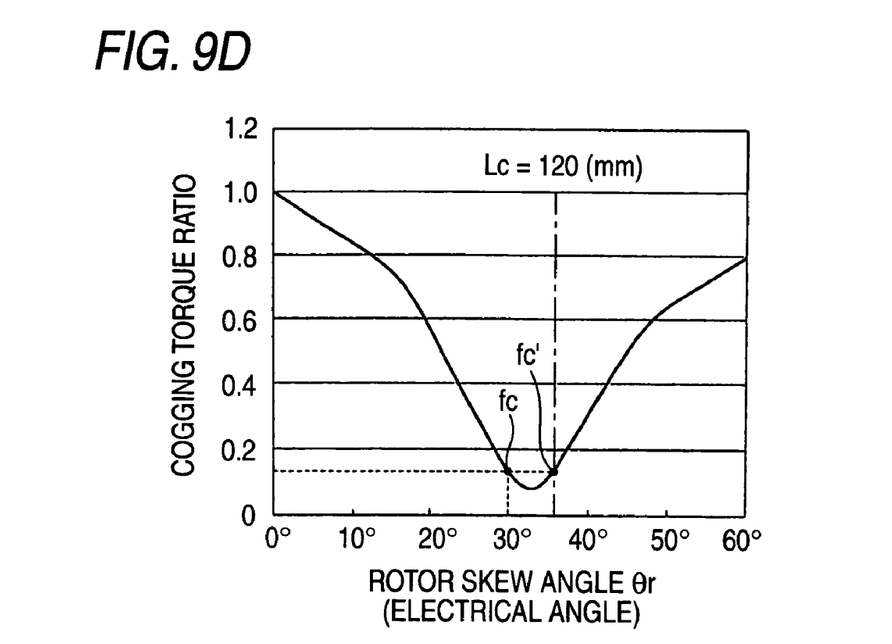

In FIG. 9D, when the axial length Lc of the stator 20 is Lc=120×10$^{-3}$(m), the rotor skew angle θr is greater than the theoretical angle θt=30° at point fc, the minimum value of the cogging torque is 32°, and the rotor skew angle θr at point fc' at which the cogging torque is equal to the theoretical angle θt=30° is 35.8°. That is, when the rotor skew angle θr is greater than the theoretical angle θt=30°, and smaller than 35.8°, the cogging torque is reduced as compared with when the rotor skew angle is set at the theoretical angle θt.

From the above discussion, the maximum value θrmax of the rotor skew angle at which the cogging torque is equal to the theoretical angle θt=30° is given by the following expression from the empirical formula based on the analysis results.

$$\theta r\max=70033 \ 10^{r-3}/Lc+\theta t \qquad (4)$$

Accordingly, to reduce the cogging torque less than at the theoretical angle θt=30° by setting the rotor skew angle θr, it is necessary to satisfy the inequality θt<θr<(700×10$^{r-3}$/Lc+θt)

Figure 10:
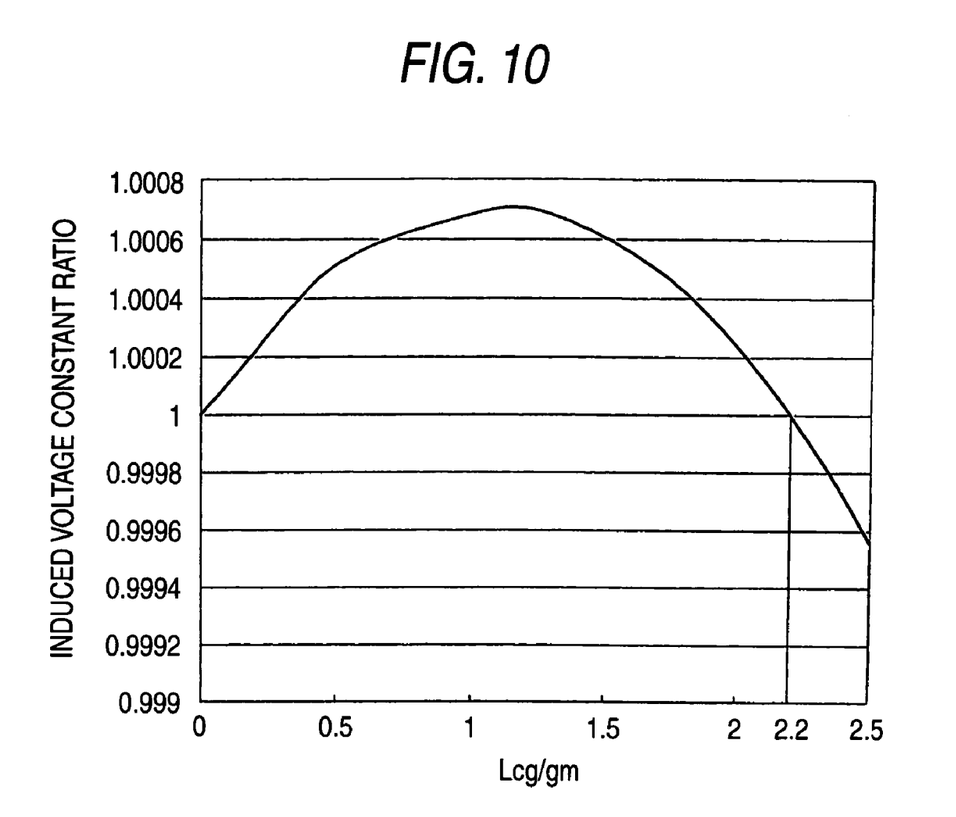
FIG. 10 is a characteristic curve showing the relationship between the induced voltage constant ratio and Lcg/gm for a permanent magnet electric motor according to another embodiment of the invention.

In the permanent magnet electric motor 10, these characteristic curves show the three dimensional analysis results for the relationship between the ratio Lcg/gm and the induced voltage constant ratio on the basis of the induced voltage constant ratio when the ratio Lcg/gm of the clearance Lcg at the top portion of the stator magnetic pole teeth to the rotor gap gm is zero.

In FIG. 10, the induced voltage constant ratio is increased, reaches the maximum value, and then decreased, as the ratio Lcg/gm is greater. Thereby, to obtain the induced voltage constant ratio at which the ratio Lcg/gm is equal to zero, it is necessary to reduce the ratio Lcg/gm below 2.2.

Thereby, the clearance Lcg at the top portion of the stator magnetic pole teeth to enhance the induced voltage constant is in a range 0<Lcg<2.2 gm.

Embodiment 2

Figure 11:
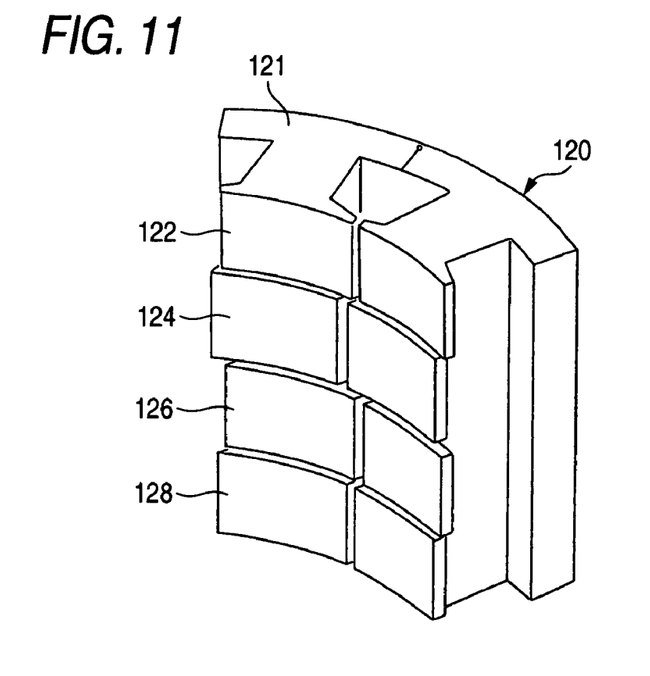
FIG. 11 is a side cross-sectional view of the permanent magnet electric motor according to another embodiment of the invention.

Another embodiment of the present invention will be described referring to FIG. 11. FIG. 11 is a perspective view of the stator according to another embodiment.

In the above embodiment 1, the fundamental wave component of cogging torque is reduced by providing the rotor iron cores 32 and 34 with the rotor skew angle θr, and the second order higher harmonic wave component of cogging torque is reduced by providing the stator iron cores 22, 24 and 26 with the stator skew angle θs.

In this embodiment, the rotor 30 is the same as in the embodiment 1, but the stator 120 is divided into four stator iron cores 122, 124, 126 and 128, whereby the second order higher harmonic wave component of cogging torque is reduced by providing the stator skew angle θs.

The stage skew angle between the stator iron core 122 and the top portion of stator magnetic pole teeth in the stator iron core 126 and between the stator iron core 124 and the top portion of the stator magnetic pole teeth in the stator iron core 128 is zero, and the stator skew angle θs between the stator iron core 122 and the stator iron core 124 and between the stator iron core 126 and the stator iron core 128 is formed.

Embodiment 3

Figure 12:
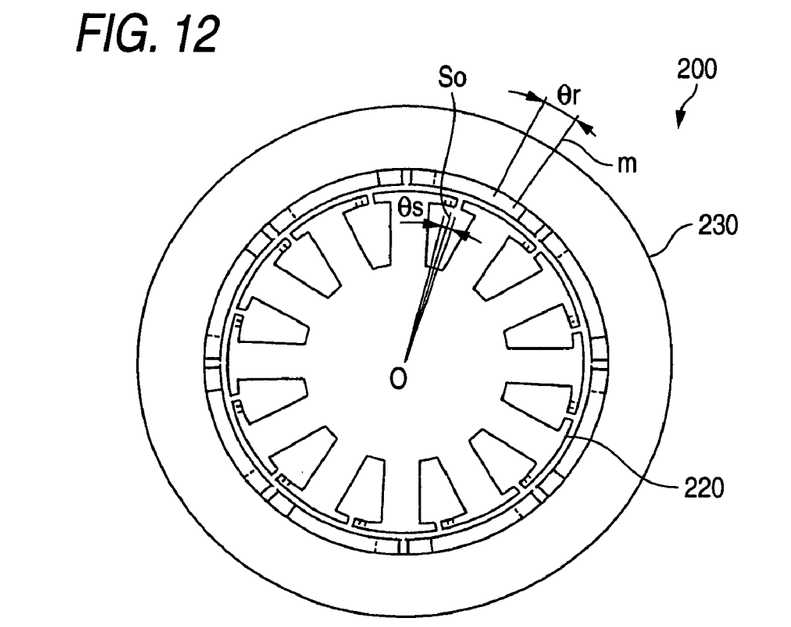
FIG. 12 is a side cross-sectional view of a permanent magnet electric motor according to a further embodiment of the invention.

Referring to FIG. 12, another embodiment of the invention will be described below. FIG. 12 is a side cross-sectional view of a permanent magnet electric motor according to another embodiment of the invention.

In the above embodiments 1 and 2, the permanent magnet electric motor has the stator 20 disposed outside and the rotor 30 disposed inside the stator 20.

The permanent magnet electric motor 200 according to this embodiment has a rotor 230 disposed outside and a stator 220 disposed inside the rotor 230.

In the above embodiments 1 to 3, the rotor 30, 230 is formed with the skew angle θr for removing the fundamental wave component of cogging torque, and the stator 20, 220 is formed with the skew angle θs for removing the second order higher harmonic wave component of cogging torque. Conversely, the rotor 30, 230 may be formed with the skew angle θs for removing the second order higher harmonic wave component of cogging torque, and the stator 20, 220 may be formed with the skew angle θr for removing the fundamental wave component of cogging torque.

INDUSTRIAL APPLICABILITY

As described above, the present invention is suitable for the purposes of the permanent magnet electric motor.

The invention claimed is:

1. A permanent magnet electric motor comprising:

a rotor having an upper stage permanent magnet and a lower stage permanent magnet provided in an axial direction on an outer circumferential face of a rotor iron core, and said lower stage permanent magnet shifted from said upper stage permanent magnet by a first stage skew angle θr with respect to a center line passing through said upper and lower stage permanent magnets, to decrease a first frequency component of a cogging torque in a circumferential direction of said rotor iron core;

a stator iron core of cylindrical shape provided with a stator winding for producing a rotating magnetic field causing said rotor to be rotated; and said stator iron core divided into plural blocks in the axial direction, and shifted by a second stage skew angle θs to decrease a second frequency component of said cogging torque in a circumferential direction of said stator iron core, wherein, when the axial length of said stator iron core is Lc (m), and a theoretical angle of said first stage skew angle θr(°) is an electrical angle θt(°), the following expression is satisfied, $$\theta t = (360°/\text{least common multiple of the number of stator magnetic poles and the number of rotor magnetic poles})/2 \quad (1)$$

$$\theta t < \theta r < (700 \times 10^{-3}/Lc + \theta t) \quad (2).$$

2. The permanent magnet electric motor according to claim 1, wherein said stator iron core is divided into a first, second and third stator block in the axial direction; and said second stage skew angle θs is provided between said first stator block and said second stator block, and between said second stator block and said third stator block.

3. The permanent magnet electric motor according to claim 2, wherein a clearance Lcg is provided between said first stator block and said second stator block, and between said second stator block and said third stator block, such that an inequality 0<Lcg<2.2 gm is satisfied, where gm is a gap between said stator and said rotor.

4. The permanent magnet electric motor according to claim 1, wherein said stator iron core is divided into a first, second, third and fourth stator block in the axial direction; and said second stage skew angle θs is provided between said first stator block and said second stator block, between said second stator block and said third stator block, and between said third stator block and said fourth stator block.

* * * * *

UNITED STATES PATENT AND TRADEMARK OFFICE
CERTIFICATE OF CORRECTION

PATENT NO. : 7,342,338 B2  
APPLICATION NO. : 10/500624  
DATED : March 11, 2008  
INVENTOR(S) : Takashi Miyazaki It is certified that error appears in the above-identified patent and that said Letters Patent is hereby corrected as shown below:

In column 2, lines 18-19, please amend the expression to move the "3" up to the exponent position in line with the minus sign, as follows (deletion shown in double bracketing):

$$\theta t < \theta r < (700 \times 10[[^-_3]]^{-3}/Lc + \theta t)$$

In column 6, line 26, expression (4), please amend as follows (deletion shown in double bracketing):

$$\theta rmax = ([[70033 \times 10^{r-3}]]\underline{700 \times 10^{-3}}/Lc + \theta t)$$

In column 6, lines 30-31, please amend the expression as follows (deletion shown in double bracketing):

$$\theta t < \theta r < (700 \times 10[[^{r-3}]]^{-3}/Lc + \theta t)$$

Signed and Sealed this

Fifth Day of August, 2008

JON W. DUDAS  
*Director of the United States Patent and Trademark Office*